US006047929A

United States Patent [19]

Kaji et al.

[11] Patent Number: 6,047,929

[45] Date of Patent: Apr. 11, 2000

[54] RADIANT TUBE SUPPORTING APPARATUS

[75] Inventors: Mitsushiro Kaji; Akio Sakurai; Yoshiharu Fujiwara, all of Kurashiki, Japan

[73] Assignee: Kawasaki Steel Corporation, Kobe, Japan

[21] Appl. No.: 09/080,266

[22] Filed: May 18, 1998

[30] Foreign Application Priority Data

May 26, 1997 [JP] Japan .................................... 9-135240

[51] Int. Cl.[7] ........................................................ F16L 3/00

[52] U.S. Cl. .............................. 248/58; 248/401; 248/56; 248/213.3; 248/55; 285/61; 285/64; 122/510; 122/511

[58] Field of Search .................................... 248/58, 213.3, 248/73, 56, 901; 285/61, 64; 122/510, 511

[56] References Cited

U.S. PATENT DOCUMENTS

| | | | |
|---|---|---|---|
| 3,385,271 | 5/1968 | Fleischer | 122/510 |
| 3,552,362 | 1/1971 | Francis | 122/510 |
| 3,938,476 | 2/1976 | Kaupp | 122/510 |
| 4,444,157 | 4/1984 | Worley | 122/510 |
| 4,485,766 | 12/1984 | Worley et al. | 122/510 |
| 5,042,452 | 8/1991 | Dubreuil et al. | 126/91 A |
| 5,480,299 | 1/1996 | Motomura et al. | 432/176 |
| 5,799,623 | 8/1998 | Born et al. | 122/510 |

FOREIGN PATENT DOCUMENTS

| | | |
|---|---|---|
| 8-278001 | 10/1996 | Japan . |
| 8-278003 | 10/1996 | Japan . |
| 661 779 | 8/1987 | Switzerland . |
| 2 127 876 | 4/1984 | United Kingdom . |

*Primary Examiner*—Ramon O. Ramirez
*Assistant Examiner*—Walter Landry
*Attorney, Agent, or Firm*—Oliff & Berridge, PLC

[57] ABSTRACT

The present invention provides a radiant tube supporting apparatus for a radiant tube arranged as a radiant heat source in a heat treatment furnace. The radiant tube is inserted through a furnace wall on one side having a supporting member attached to a bend at the tip of the radiant tube. The supporting member projects to outside the furnace through the furnace wall on the other side, and a bearing member bearing the supporting member is provided outside the furnace.

13 Claims, 4 Drawing Sheets

PRIOR ART

RADIANT TUBE SUPPORTING APPARATUS

BACKGROUND OF THE INVENTION

1. Field of the Invention

The present invention relates to a radiant tube supporting apparatus used as a radiant heat source for a heat treatment furnace of heating or annealing facilities of a material to be heat-treated.

2. Description of the Related Art

A radiant tube is usually used as a radiant heat source for a heat treatment furnace of heating or annealing facilities for a material to be heat-treated. The radiant tube comprises a heat-resistant alloy steel tube, and is arranged in the furnace through the furnace wall. The tube has a gas burner in the interior thereof, and the furnace interior is radiant-heated by red-heating the tube through combustion of a gas by igniting the gas burner. When arranging the radiant tube in the furnace, a U-shape, W-shape or P-shape portion running through the furnace wall is secured to the furnace wall, and the portion in the furnace expands and contracts with this secured portion as a fulcrum under the effect of thermal expansion.

FIG. 5 illustrates a typical structure of a conventional W-shape radiant tube. The W-shape radiant tube 2 having a tip portion connected by a bend 3 after running through a furnace wall 1 of the furnace body is arranged in the furnace. A gas burner 11 is arranged inside the entry side at the inserting portion of the radiant tube 2, and a recuperator 12, inside the exit side.

A supporting member 13 is attached to the bend 3 at the tip of the radiant tube 2 on the furnace interior side and a bracket 14 bearing this supporting member 13 is secured by welding to the furnace wall 1' on the opposite side. The supporting member 13 is slidably supported on this bracket 14. Similar apparatuses are disclosed in Japanese Unexamined Patent Publications No. 8-278,001 and No. 8-278,003.

The conventional supporting apparatus of a radiant tube comprising the supporting member and the bracket supporting the same provided in the furnace as described above has a problem in that a long-time service results in an increased sliding resistance between the supporting member and the bracket under the effect of thermal expansion, heat deformation, chemical changes, surface deterioration and other causes, thus preventing smooth sliding. As a result, a galling or a breakage is caused at the bearing portion, or a serious stress is produced in the radiant tube, causing bending, deformation and breakage, and hence leading to a shorter service life. Maintenance is not therefore easy.

A rotating member may be provided in the furnace, or a rolling member may be arranged at the bearing portion as a supporting apparatus of the radiant tube. However, exposure to high temperature is always existent, and these conceivable measures cannot be a complete solution of the foregoing problem.

The present invention provides a supporting apparatus for a radiant tube, which can solve the above-mentioned problem. More particularly, the invention provides a supporting apparatus which alleviates sliding resistance upon thermal expansion and contraction of the radiant tube, and achieve this at a low cost.

SUMMARY OF THE INVENTION

The present invention has a configuration in which a supporting apparatus bearing a supporting member is not exposed to a high-temperature atmosphere and does not constrain thermal expansion or contraction of a radiant tube at all. More specifically, the invention relates to a supporting apparatus of a radiant tube, in which, for a radiant tube arranged as a radiant heat source in a heat treatment furnace, being inserted through a furnace wall, a supporting member is attached to a bend at the tip of the radiant tube to cause the supporting member to run through the furnace wall on the other side to project outside the furnace, and a member bearing the supporting member is provided outside the furnace. In this case, the bearing member should preferably have a structure supporting the supporting member movably in the expansion/contraction direction of the radiant tube. While the bearing member may slidably support the supporting member, it should preferably have a structure easily movable by means of a roller, a cam follower, a linear guide or the like.

It is desirable to apply a flexible seal expanding/contracting in response to displacement of the supporting member to the portion where the supporting member runs through the furnace wall, and to use a refractory material for the seal interior and/or as the supporting member so as to inhibit a heat loss to outside the furnace.

A cooler may be provided as required for the supporting apparatus, thus making the apparatus excellent in durability, greatly reducing the effect of heat to the bearing member.

DESCRIPTION OF THE PREFERRED EMBODIMENTS

In the present invention, a supporting member is attached to a bend at the tip of a radiant tube. The radiant tube is used as a radiant heat source, arranged in a heating furnace such as an annealing furnace or a heat treatment furnace by inserting the radiant tube through a side of a first furnace wall. This supporting member runs through, and projects from, a second furnace wall. A bearing member bearing the supporting member is provided outside the furnace. The bearing member permits smooth and easy displacement of the supporting member when the supporting member is displaced by expansion and contraction of the radiant tube. By providing the bearing member bearing the supporting member outside the furnace, it is possible to form a simple supporting apparatus having a low sliding resistance.

Figure 1:
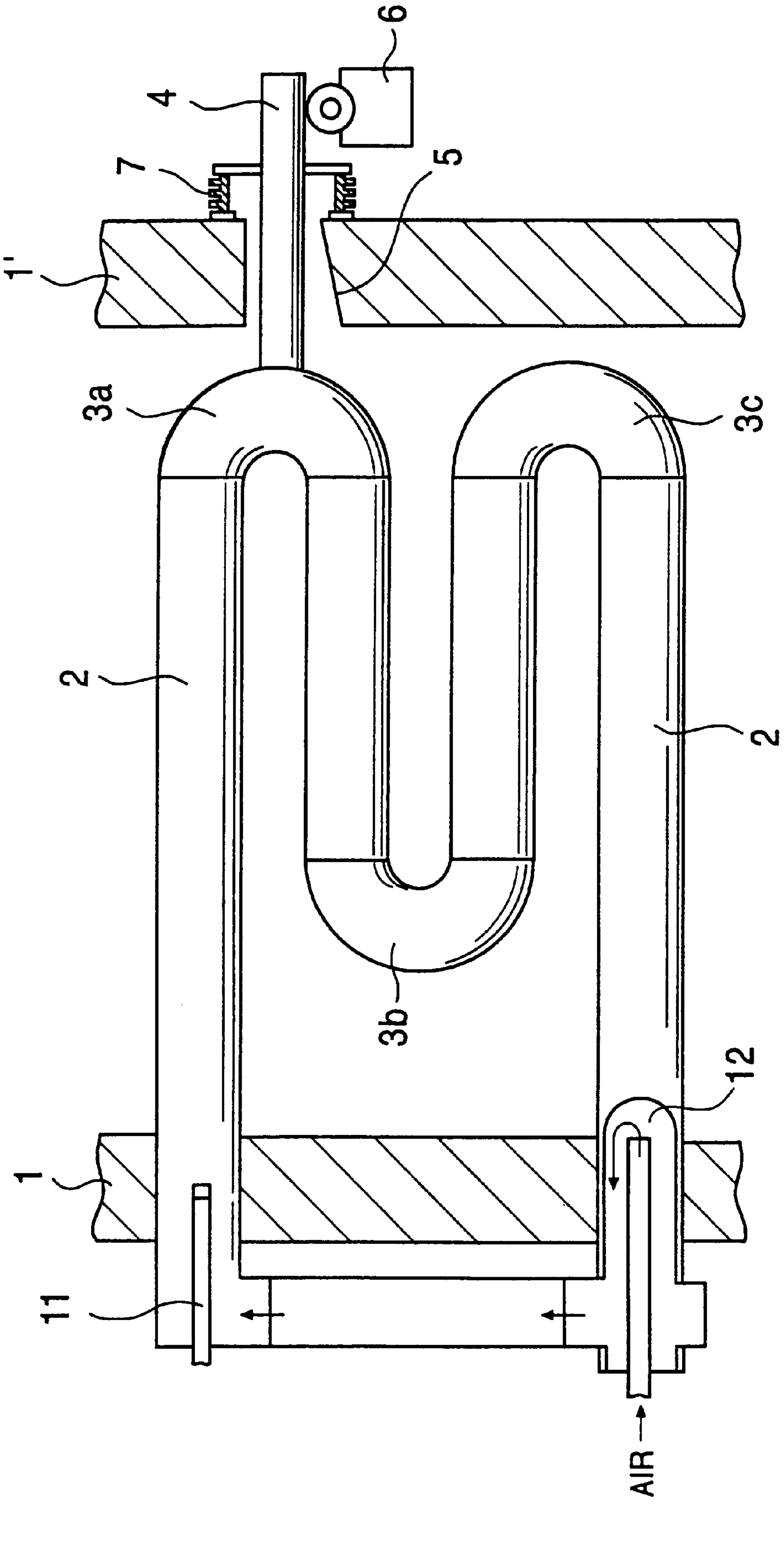
FIG. 1 is a side view illustrating an embodiment of the invention.
Figure 2A:
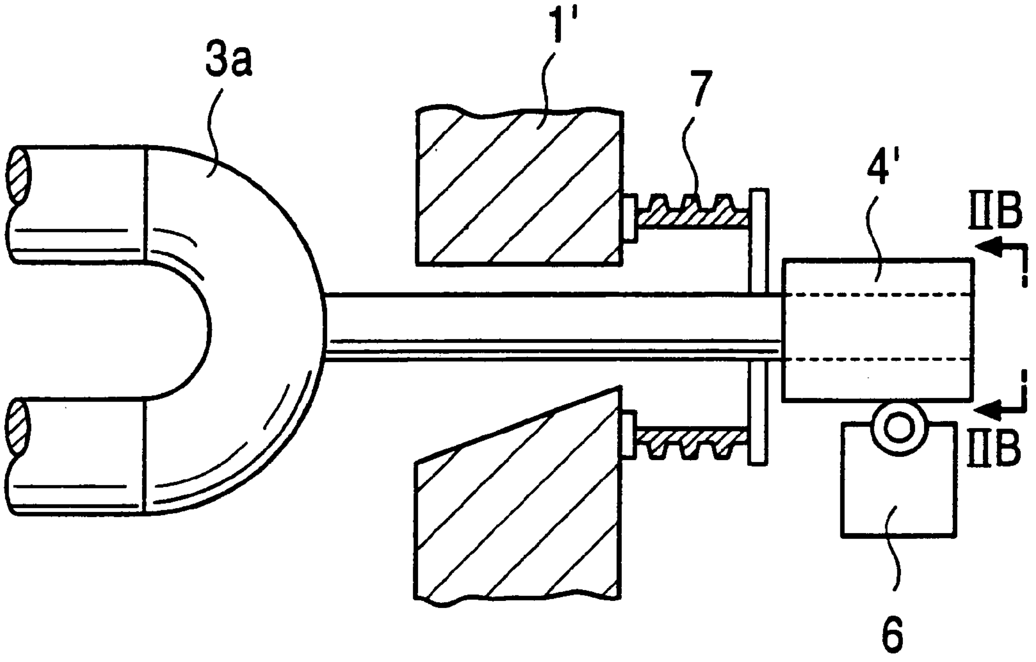
FIG. 2 is a descriptive view illustrating the embodiment of the invention.
Figure 2B:
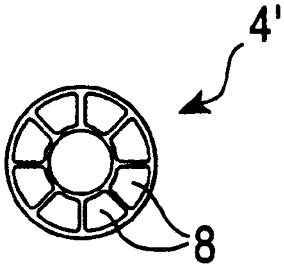

Now, embodiments of the invention will be described below with reference to the drawings. FIG. 1 is a side view illustrating an embodiment of the invention. FIG. 2 is a descriptive view illustrating the embodiment of the invention. FIG. 2(*a*) is an enlarged side view of FIG. 1, and FIG. 2(*b*) is a sectional view of FIG. 2(*a*) cut along the line IIB—IIB.

In the invention, the radiant tube is inserted through a furnace wall 1 on one side of the furnace body and arranged in the furnace, having a U-shape or a W-shape. The tip portion thereof is connected by bends 3*a*, 3*b* and 3*c*. A gas burner 11 is arranged in the interior of the entry side of the furnace where the radiant tube 2 is inserted, and a recuperator 12 is arranged in the interior of the exit side of the furnace. The supporting apparatus of the radiant tube 2 of the invention is provided by attaching a supporting member 4 to the bend 3*a* at the tip of the radiant tube 2 arranged in the furnace, inserting the supporting member 4 through a throughhole 5 previously pierced in the furnace wall 1' on the other side, and placing the same on a bearing member 6 outside the furnace. Preferably the bearing member 6 has a roller or a linear guide so as to permit smooth and easy displacement of the radiant tube 2 caused by thermal expansion or contraction upon heating the furnace. The supporting apparatus outside the furnace should be flexibly movable to smoothly cope with thermal expansion or contraction of the radiant tube. A flexible seal 7 playing this role is provided. Regarding the flexible seal 7, it is desirable to use a commercially available expansion joint having a function of absorbing thermal expansion and contraction of piping by causing a high-temperature fluid to flow through. As a measure to prevent supporting member heating during operation of the furnace, for example, a supporting member 4' having an air cooling structure provided with an air passage way 8 as shown in FIG. 2(*b*), or a cooler such as a water cooling structure may be provided as required for the supporting member 4.

Figure 3:
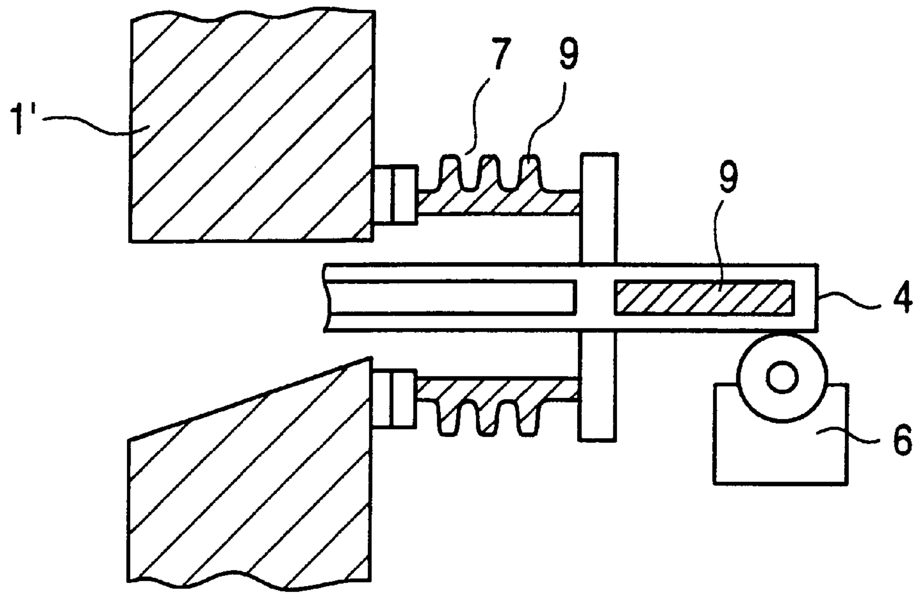
FIG. 3 is a side view illustrating another embodiment of the invention.
Figure 4:
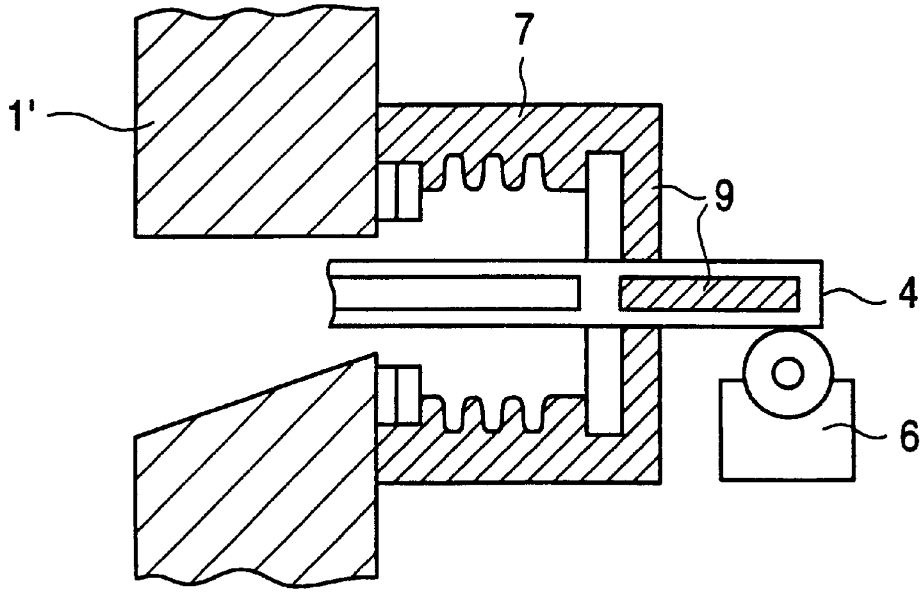
FIG. 4 is a side view illustrating a further embodiment of the invention.

Heat loss to outside the furnace should preferably be inhibited. FIGS. 3 and 4 illustrate inhibiting means of heat loss to outside the furnace. FIG. 3 represents a case where an adiabatic material 9 is used for the flexible seal 7 having an expanding function in the interior: the adiabatic material 9 is also inserted into the supporting member 4. FIG. 4 represents a case where an adiabatic material 9 is used for the flexible seal 7 having an expanding function to outside: the adiabatic material 9 is also inserted in the supporting member 4.

Though not shown in FIG. 1, supporting apparatuses similar to that for the bend 3*a* may be provided also for the bends 3*b* and 3*c*.

As described above, maintenance of the portion bearing the supporting member 4 of the radiant tube 2 is facilitated by providing the bearing member 6 outside the furnace so as to permit absorption of thermal expansion and contraction of the radiant tube 2. This structure, not constraining thermal expansion or contraction of the radiant tube 2, makes it possible to prevent occurrence of an abnormal stress within the radiant tube 2, and to avoid occurrence of deformation or cracks in the radiant tube 2.

The present invention is effectively applicable to all heat treating conditions of a heat treatment furnace such as that for heating or annealing a material to be heat-treated.

EXAMPLES

Figure 5:
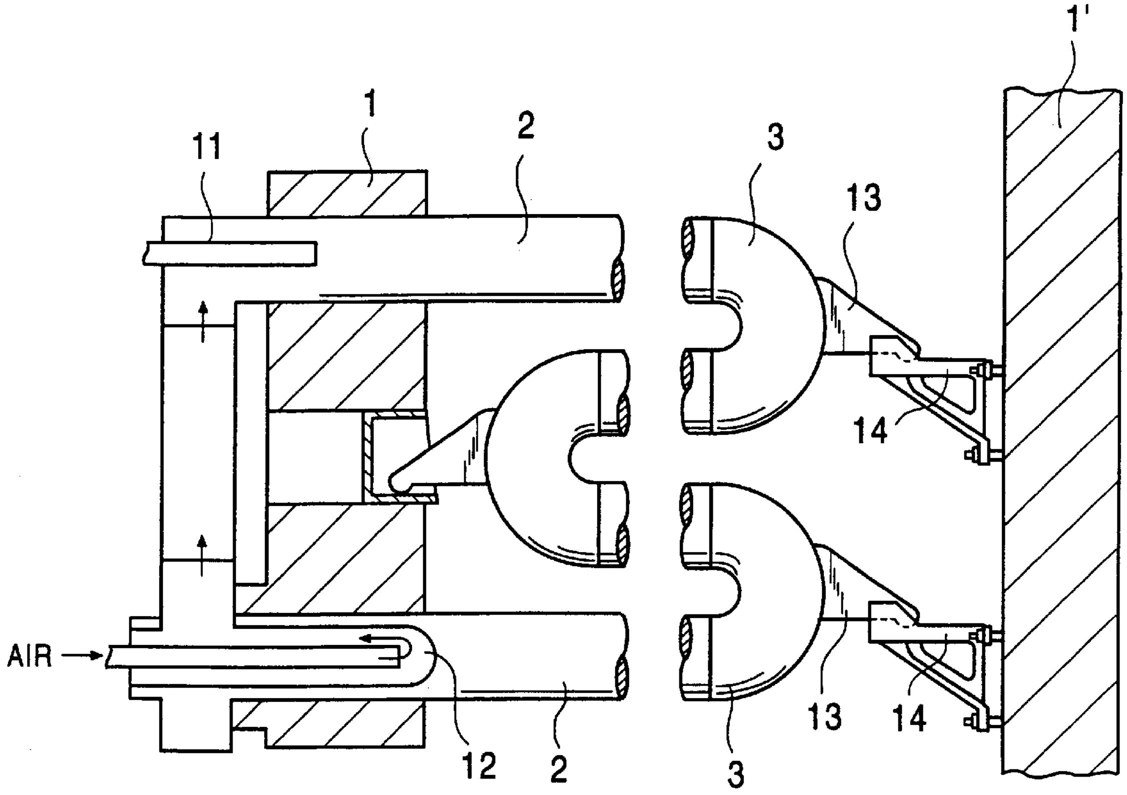
FIG. 5 is a side view illustrating a conventional case.

A comparison test was carried out on facilities in which the radiant tube supporting apparatus of the invention shown in FIGS. 1 and 2 was attached to a continuous annealing furnace of steel sheet and on facilities in which a conventional supporting apparatus shown in FIG. 5 was attached, to see a bending deformation of the radiant tube. The results are shown in Table 1.

In the example of the invention, as compared with the conventional case, bending deformation of the radiant tube was largely reduced.

TABLE 1

| Evaluation criteria | Conventional art | Invention |
|---|---|---|
| Bending of ant tube (after one year service) | 36 mm max. | 5 mm max. |

According to the invention, it is possible to avoid the restriction imposed by thermal expansion or contraction of the radiant tube. Maintenance of the supporting apparatus is easier and cooling is facilitated. As a result, deformation of the radiant tube is largely reduced, with a considerably extended service life.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention.

What is claimed is:

1. A radiant tube supporting apparatus comprising:

a supporting member attached to a radiant tube; and a bearing member disposed outside a furnace bearing the supporting member, the supporting member extending from inside the furnace to outside the furnace through a wall and a flexible seal wherein a movement between the supporting member and the bearing member is in a direction of thermal expansion and contraction of the radiant tube.

2. The apparatus of claim 1, wherein the supporting member is attached to the radiant tube at a bend of the radiant tube.

3. The apparatus of claim 2, wherein the bend of the radiant tube is disposed at a tip of the radiant tube.

4. The apparatus of claim 1, wherein the radiant tube is a heat source for the furnace.

5. The apparatus of claim 1, wherein the furnace is a heat treatment furnace.

6. The apparatus of claim 1, further comprising a seal, wherein the supporting member extends through an opening in the furnace wall and the seal seals the opening outside the furnace.

7. The apparatus of claim 6, wherein the seal expands and contracts in response to a movement of the supporting member.

8. The apparatus of claim 7, wherein the seal comprises an adiabatic material.

9. The apparatus of claim 8, wherein the adiabatic material expands and contracts the seal.

10. The apparatus of claim 1, further comprising a cooling structure disposed on the supporting member.

11. The apparatus of claim 1, wherein the supporting member comprises an adiabatic material.

12. A radiant tube supporting apparatus comprising:

a supporting member attached to a radiant tube; and a bearing member disposed outside a furnace bearing the supporting member, the supporting member extending form inside the furnace to outside the furnace through a furnace wall and a flexible seal, wherein the bearing member and the supporting member are movable relative to each other.

13. The apparatus of claim 12, wherein the bearing member bears the supporting member by one of a slide, a roller, a cam follower, and a linear guide.

* * * * *